US012732886B2

(12) United States Patent
Subrahmanya et al.

(10) Patent No.: US 12,732,886 B2
(45) Date of Patent: Sep. 8, 2026

(54) SYSTEMS AND METHODS FOR DYNAMICALLY CONTROLLING THE CONFIGURATION OF A MODEM OF A USER EQUIPMENT DEVICE

(71) Applicant: Apple Inc., Cupertino, CA (US)

(72) Inventors: Parvathanathan Subrahmanya, Sunnyvale, CA (US); Leilei Song, Sunnyvale, CA (US); Mariam Motamed, Redwood City, CA (US); Navid Ehsan, San Diego, CA (US); Sharad Sambhwani, San Diego, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 18/372,039

(22) Filed: Sep. 22, 2023

(65) Prior Publication Data

US 2024/0114424 A1 Apr. 4, 2024

Related U.S. Application Data

(60) Provisional application No. 63/409,351, filed on Sep. 23, 2022.

(51) Int. Cl.
*H04W 40/04* (2009.01)

(52) U.S. Cl.
CPC .................................. *H04W 40/04* (2013.01)

(58) Field of Classification Search
CPC .................................................... H04W 40/04
See application file for complete search history.

(56) References Cited

U.S. PATENT DOCUMENTS 11,336,575 B1 * 5/2022 Milley ................ H04L 43/0876
2014/0293886 A1 * 10/2014 Thakkar ............. H04L 41/0803
370/329

* cited by examiner

*Primary Examiner* — Jamal Javaid
(74) *Attorney, Agent, or Firm* — Fish & Richardson P.C.

(57) ABSTRACT

Disclosed are methods, systems, and computer-readable medium to perform operations including obtaining first data regarding one or more applications running on a UE device, where the first data represents, for each of the one or more applications, an individual network usage characteristic of that application; determining, based on the first data, second data regarding the one or more applications, where the second data represents a composite network usage characteristic of the one or more applications; selecting, based on the second data, a first modem configuration from among a plurality of candidate modem configurations; and causing a modem of the UE device to operate according to the first modem configuration.

19 Claims, 9 Drawing Sheets

SYSTEMS AND METHODS FOR DYNAMICALLY CONTROLLING THE CONFIGURATION OF A MODEM OF A USER EQUIPMENT DEVICE

CROSS-REFERENCE TO RELATED APPLICATION

This application claims priority to U.S. Provisional Patent Application No. 63/409,351, filed Sep. 23, 2022, the entire contents of which are incorporated herein by reference.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

SUMMARY

In accordance with one aspect of the present disclosure, a user equipment (UE) device includes one or processors and one or more storage devices on which are stored instructions that are operable, when executed by the one or more processors, to cause the one or more processors to perform various operations. The operations include: obtaining first data regarding one or more applications running on the UE device, where the first data represents, for each of the one or more applications, an individual network usage characteristic of that application; determining, based on the first data, second data regarding the one or more applications, where the second data represents a composite network usage characteristic of the one or more applications; selecting, based on the second data, a first modem configuration from among a plurality of candidate modem configurations; and causing a modem of the UE device to operate according to the first modem configuration.

Implementations of this aspect can include one or more of the following features.

In some implementations, for each of the one or more applications, the individual network usage characteristic of that application can include at least one of: an individual communication session duration associated with that application, an individual burst period associated with that application, an individual burst size associated with that application, or an individual burst service latency limit associated with that application.

In some implementations, the composite network usage characteristic can include a composite communication session duration associated with the one or more applications collectively.

In some implementations, the composite communication session duration can be determined by identifying a shortest of the individual communication session durations.

In some implementations, the composite network usage characteristic can include a composite burst period associated with the one or more applications collectively.

In some implementations, the composite burst period can be determined by identifying a shortest of the individual burst periods.

In some implementations, the composite network usage characteristics can include a composite data rate associated with the one or more applications collectively.

In some implementations, the composite data rate can be determined by: determining, for each of the applications, a ratio of (i) a sum of the individual burst size associated with the one or more applications that are less than or equal to the individual burst size of that application, and (ii) the individual burst service latency limit associated with the application; and determining a largest of the ratios.

In some implementations, each of the candidate modem configurations can represent one or more parameters for transmitting and/or receiving data using the modem.

In some implementations, the one or more parameters can include at least one of: a Connected Mode Discontinuous Reception (C-DRX) parameter, a Connected Mode Discontinuous Transmission (C-DTX) parameter, a Ratio Access Technology (RAT) parameter, an antenna configuration parameter, a radio frequency (RF) chain configuration parameter, a component carrier configuration parameter, a bandwidth configuration parameter, a receiver algorithmic mode parameter, a transmitter algorithmic mode parameter, an energy profile parameter, or a burst service latency parameter.

In some implementations, the first data can represent, for each of the one or more applications, a user preference regarding that application.

In some implementations, for each of the one or more applications, the user preference can include at least one of: a preference prioritizing an energy efficiency of the application, or a preference prioritizing a network performance of the application.

In some implementations, the user preference can be received using a user interface presented by the UE device.

In some implementations, causing the modem to operate according to the first modem configuration can include causing the modem to switch from a second first modem configuration from among the plurality of candidate modem configurations to the first modem configuration.

In some implementations, causing the modem to switch from the second first modem configuration to the second first modem configuration can include determining a transition from the second modem configuration to the first modem configuration using a state machine.

In some implementations, selecting the first modem configuration can include determining that the first modem configuration satisfies the composite network usage characteristic.

In some implementations, at least some of the plurality of candidate modem configurations can be received by the UE device from a base station (BS) of a wireless network.

In some implementations, at least some of the plurality of candidate modem configurations can be transmitted from the UE device to a base station (BS) of a wireless network.

In another aspect, an apparatus includes one or more baseband processors configured to perform any of the operations described herein.

In another aspect, a method includes any of the operations described herein.

In another aspect, an apparatus includes one or more baseband processors configured to perform any of the operations(s) described herein.

In another aspect, a system includes one or processors and one or more storage devices on which are stored instructions that are operable, when executed by the one or more processors, to cause the one or more processors to perform any of the operations(s) described herein.

In another aspect, a non-transitory computer storage medium is encoded with instructions that, when executed by one or more processors, cause the one or more processors to perform any of the operations(s) described herein.

The details of one or more embodiments of these systems and methods are set forth in the accompanying drawings and the description below. Other features, objects, and advantages of these systems and methods will be apparent from the description and drawings, and from the claims.

DETAILED DESCRIPTION

In general, electronic devices can communicate with one another via a wireless network. As an example, a first electronic device (e.g., user equipment, UE) can establish one or more wireless links with a second electronic device (e.g., a base station, BS) using one or more wireless communications modules (e.g., one or more wireless modems, radios, transmitters, receivers, transceivers, etc.). Further, the first electronic device can transmit data to and/or receive data from the second device using the one or more wireless links.

In some implementations, an electronic device can execute one or more applications, each of which is configured to transmit and/or receive data via the wireless network. Further, each of the applications may have different respective network usage characteristics pertaining to the transmission and/or reception of data via the wireless network. As an example, an application may be configured to transmit a large amount of data over the wireless network over a short period of time, and correspondingly may have a preference or requirement for a greater amount of resources to facilitate the exchange of data (e.g., a large amount of bandwidth or throughput, a low network latency, etc.). As another example, an application may be configured to transmit a small amount of data over the wireless network over a period of time, and correspondingly may have a preference or requirement for a smaller amount of resources to facilitate the exchange of data (e.g., a small amount of bandwidth or throughput).

In some implementations, the electronic device can monitor the network usage characteristics of each of the applications, and dynamically configure a communication module of the electronic device to facilitate the transmission and/or receipt of data by each of the applications in an effective and efficient manner. For example, when executing applications having intensive network usage characteristics, the electronic device can dynamically configure a communication module to expend a greater amount of resources to meet the preferences or requirements of the applications. As another example, when executing applications having less intensive network usage characteristics, the electronic device can dynamically configure a communication module to expend a lesser amount of resources (e.g., to reduce the power that is consumed by the electronic device).

Example system and techniques for dynamically configuring a communication module of an electronic device based on the network usage characteristics of applications are described in further detail below.

Figure 1:
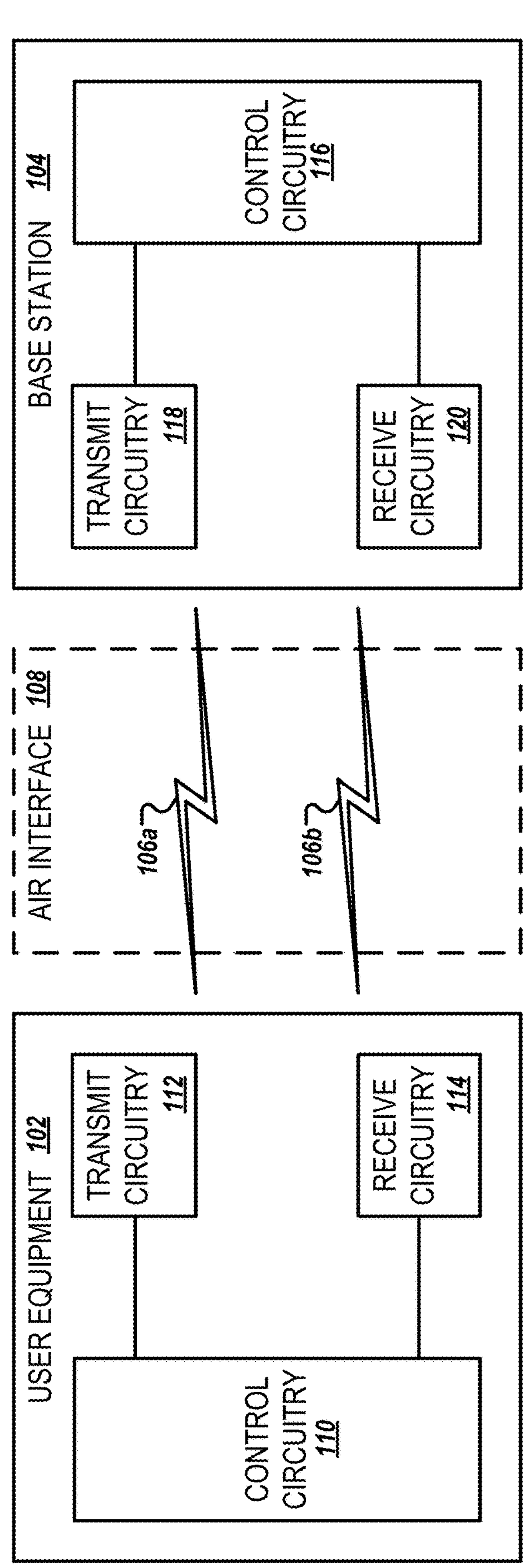
FIG. 1 illustrates a wireless network, according to some implementations.

FIG. 1 illustrates a wireless network 100, according to some implementations. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

In some implementations, the wireless network 100 may be a Non-Standalone (NSA) network that incorporates Long Term Evolution (LTE) and Fifth Generation (5G) New Radio (NR) communication standards as defined by the Third Generation Partnership Project (3GPP) technical specifications. For example, the wireless network 100 may be an E-UTRA (Evolved Universal Terrestrial Radio Access)-NR Dual Connectivity (EN-DC) network, or a NR-EUTRA Dual Connectivity (NE-DC) network. However, the wireless network 100 may also be a Standalone (SA) network that incorporates only 5G NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, laptop computers, smartphones, tablet computers, machine-type devices such as smart meters or specialized devices for healthcare, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some implementations, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry.

In various implementations, aspects of the transmit circuitry 112, receive circuitry 114, and control circuitry 110 may be integrated in various ways to implement the operations described herein. The control circuitry 110 may be adapted or configured to perform various operations such as those described elsewhere in this disclosure related to a UE. For instance, the control circuitry 110 can be adapted or configured to dynamically adjust the number and/or type of RATs used to establish wireless links between the UE 102 and the base station 104 (e.g., using the transmit circuitry 112 and/or the receive circuitry 114).

The transmit circuitry 112 can perform various operations described in this specification. For example, the transmit circuitry 112 can be adapted or configured to dynamically establish and/or terminate one or more wireless links between the user equipment 102 and the base station 104 (e.g., using one or more RATs, in accordance with commands provided by the control circuitry 110). Additionally, the transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108.

The receive circuitry 114 can perform various operations described in this specification. For instance, the receive circuitry 114 can be adapted or configured to dynamically establish and/or terminate one or more wireless links between the user equipment 102 and the base station 104 (e.g., using one or more RATs, in accordance with commands provided by the control circuitry 110). Additionally, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In implementations, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108. The transmit circuitry 118 and receive circuitry 120 may be adapted to transmit and receive data, respectively, to any UE connected to the base station 104. The transmit circuitry 118 may transmit downlink physical channels includes of a plurality of downlink subframes. The receive circuitry 120 may receive a plurality of uplink physical channels from various UEs, including the UE 102.

In FIG. 1, the one or more channels 106A, 106B are illustrated as an air interface to enable communicative coupling, and can be consistent with cellular communications protocols, such as a GSM protocol, a CDMA network protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In implementations, the UE 102 may directly exchange communication data via a ProSe interface. The ProSe interface may alternatively be referred to as a sidelink (SL) interface and may include one or more logical channels, including but not limited to a Physical Sidelink Control Channel (PSCCH), a Physical Sidelink Control Channel (PSCCH), a Physical Sidelink Discovery Channel (PSDCH), and a Physical Sidelink Broadcast Channel (PSBCH).

As described above, to improve the performance of an electronic device (e.g., a UE device), the electronic device can monitor the network usage characteristics of each of the applications that are running on the electronic device. Further, the electronic device can dynamically configure a communication module of the electronic device to facilitate the transmission and/or receipt of data by each of the applications in an effective and efficient manner.

Figure 2:
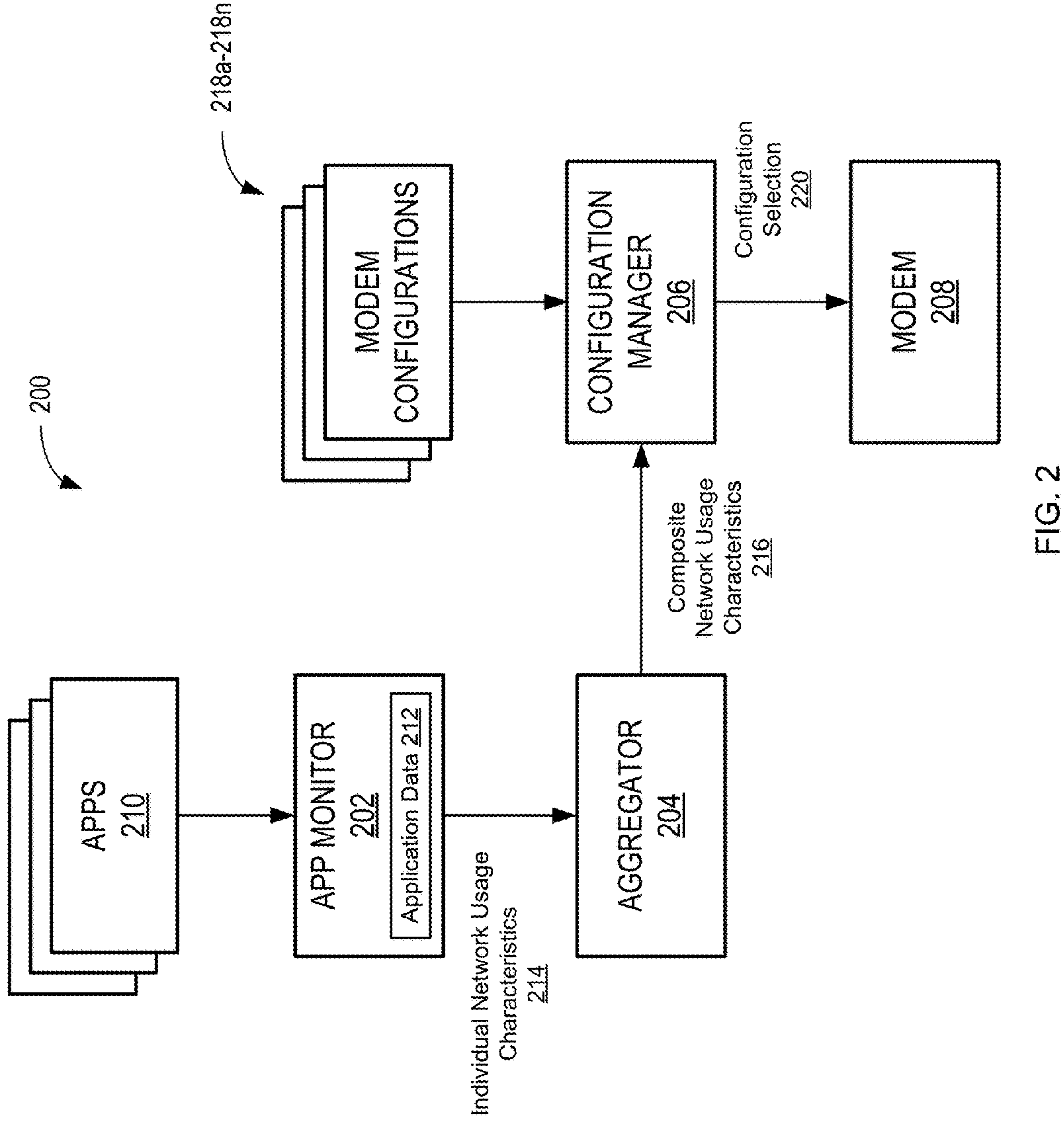
FIG. 2 illustrates an example system for dynamically configuring a communication module of the electronic device.

FIG. 2 shows an example system 200 for performing at least some of the operations described herein. The system 200 includes an application monitor 202, an aggregator 204, a configuration manager 206, and a modem 208. In some implementations, the system 200 can be implemented, at least in part, in a UE device (e.g., the UE 102 shown in FIG. 1). In some implementations, the system 200 can be implemented, at least in part, in control circuitry, transmit circuitry, and/or receive circuitry of a UE device (e.g., control circuitry 110, transmit circuitry 112, and/or receive circuitry 114 shown in FIG. 1).

In an example operation of that system 200, the application monitor 202 monitors the execution and operation of each of several applications 210, and generates application data 212 pertaining to each of the applications 210. Each of the applications 210 can be an application that is executed and/or running on a UE device. For instance, the applications 210 can include media streaming applications, web browsers, social media applications, chat applications, financial applications, or any other application that may run on a UE device.

In general, the application data 212 represents the network usage characteristics of each of the applications 210. In some implementations, the application data 212 can include information regarding a current usage of network resources by each of the applications 210, a historical usage of network resources by each of the applications 210, and/or a predicted or estimated future usage of network resources by each of the applications 210. In some implementations, the application data 212 can include information regarding one or more preferences of the applications (e.g., a preferred level of service) and/or one or more requirements of the applications (e.g., a required level of service). In some implementations, the application data 212 can include information regarding how an application is communicating or is intending to communicate via a wireless network. In some implementations, at least some of the application data 212 may also be referred to as "communication intent descriptors."

As an example, the application data 212 can indicate a session duration for each of the applications 210. The session duration of an application may refer to time duration of a communications session by the application (e.g., to transmit and/or receive data via the wireless network). In some implementations, the application data 212 can indicate a current session duration of an application, a historical session duration of an application, and/or an estimated or predicted future session duration of an application. In some implementations, the application data 212 can indicate a preference or requirement by an application for a particular session duration.

As another example, the application data 212 can indicate burst period for each of the applications 210. The burst period of an application may refer to the length of time between bursts of communication by the application (e.g., for "bursty" applications). For instance, an application may transmit and/or receive data via the wireless network in a sequence of bursts, and the burst period may refer to the length of time between two consecutive bursts in the sequence. In some implementations, the application data 212 can indicate a current burst period of an application, a historical burst period of an application, and/or an estimated or predicted future burst period of an application. In some implementations, the application data 212 can indicate a preference or requirement by an application for a particular burst period.

As another example, the application data 212 can indicate a burst size for each of the applications 210. The burst period of an application may refer to amount of data that is transmitted and/or received in a burst of communication by the application (e.g., a number of bits or bytes). In some implementations, the application data 212 can indicate a current burst size of an application, a historical burst size of an application, and/or an estimated or predicted future burst size of an application. In some implementations, the application data 212 can indicate a preference or requirement by an application for a particular burst size.

As another example, the application data 212 can indicate a burst service latency limit for each of the applications 210. The burst service latency limit may refer to a preference or requirement by an application for a particular degree of latency when communicating with a wireless network. As an example, the burst service latency limit for an application may refer to the application's preference or requirement for a particular maximum allowable latency when transmitting data to and/or receiving data from the wireless network. For instance, an application that is configured to transmit data to and/or receive data from a wireless network in real time may have a low burst service latency limit, whereas an application that is configured to transmit data to and/or receive data in non-real time may have a high burst service latency limit.

In some implementations, the burst service latency limit may refer specifically to the latency of wireless signals transmitted between the electronic device (e.g., a UE device) and a device of the wireless network (e.g., a base station), also referred to as the latency of "over the air" transmissions between them.

In some implementations, burst service latency may refer to the end-to-end delay between the two communicating devices. The communicating devices may be of different types and located at different network termination point (e.g., one or both of the devices may be mobile devices, one of the devices may be a web server, media server, application server running in the cloud, etc.)

As another example, the application data 212 can indicate a reliability metric for each of the applications 210. The reliability metric may refer to a preference or requirement by an application for a particular degree of reliability when communicating with a wireless network. For example, the reliability metric for an application may refer to the application's preference or requirement for a particular likelihood that data is successfully transmitted to and/or received from the wireless network (e.g., in accordance with a particular acceptable degree of latency). For instance, an application that is configured to transmit data to and/or receive data from a wireless network losslessly may have a high reliability metric, whereas an application that is configured to transmit data to and/or receive data in a lossy manner may have a low reliability metric.

In some implementations, the application data 212 can include statistical information regarding the network usage characteristics of each of the applications 210. For example, the application data 212 can indicate the average or median of one or more of the characteristics. As another example, the application data 212 can indicate a particular percentile of one or more of the characteristics (e.g., $90^{th}$ percentile, $95^{th}$ percentile, $99^{th}$ percentile, or any other percentile).

In some implementations, the application data 212 can indicate network usage characteristics of each of the applications 210 numerically (e.g., numerical representations of each of the network usage characteristics).

In some implementations, the application data 212 can indicate network usage characteristics of each of the applications 210 through the use of categories or bins. For instance, each of the network usage characteristics can be binned into subjective categories or bins.

As an example, a set of categories or bins can include "high," "medium," "low," etc. (e.g., referring to the relative amount of resources that is used, preferred, and/or requested by each application).

As another example, a set of categories or bins can include "slow," "medium," "fast," etc. (e.g., referring to the relative data throughput that is used, preferred, and/or requested by each application).

As another example, a set of categories or bins can include "on" and "off" (e.g., referring to whether each application is transferring data or is intending to transfer data via a wireless network).

As another example, a set of categories or bins can include "interactive" and "background." "Interactive" may refer to applications that are currently being used or predicted to be used by a user actively, which may consume a larger amount of resources. "Background" may refer to applications that are currently running or predicted to be running in the background without the user's active interaction, which may consume a lesser amount of resources.

As another example, each of the network usage characteristics can be binned into categories or bins having respective ranges of numerical values. For example, a first category or bin can correspond to a numerical range of greater than 0 units and less than or equal to 10 units, a second category or bin can correspond to a numerical range of greater than 10 units and less than or equal to 20 units, and so forth.

In some implementations, the application data 212 can indicate changes to the network usage characteristics of an application over time. As an example, the application data 212 can include time series measurements of the network usage characteristics over time. For instance, the application data 212 can include time series measurements of the session duration, burst period, current burst, burst size, burst service latency limit, reliability metric, and/or any other characteristics of each of the applications 210.

As another example, an application may operating according to multiple different states, each having a different set of network usage characteristics. Further, the application data 212 can indicate the network usage characteristics of an application over time (e.g., as the application progresses between states). For instance, an application 210 can be a video streaming application that receives video data from a wireless network according to a set of states. In a first state, the application 210 can receive a large amount of video data via the wireless network to full a video buffer (e.g., to facilitate uninterrupted presentation of a video of a user). Upon filling the video buffer, the application 210 switches to a second state in which the application 210 receives data from the wireless network intermittently (e.g., to intermittently refill the video buffer as the video is presented to the user). Further, upon receiving the entirety of the video, the application 210 switches to a third state in which the application 210 does not retrieve any further video data from the wireless network. During the application's first state, the application data 212 can indicate that the application 210 is in a "high" category or bin (e.g., corresponding to a high degree of network usage by the application). Further, during the application's second state, the application data 212 can indicate that the application 210 is in a "medium" category or bin (e.g., corresponding to a moderate degree of network usage by the application). Further, during the application's third state, the application data 212 can indicate that the application 210 is in a "low" category or bin (e.g., corresponding to a low degree of network usage by the application).

Although example categories, bins, and ranges are described herein, other categories, bins, or ranges are also possible, either instead or in addition to those described herein.

In some implementations, the applications 210 can expressly signal at least a portion of the application data 212 to the application monitor 202 (e.g., by transmitting signaling information to the application monitor 202 representing at least the portion of the application data 212). For example, each of the applications 210 can signal a respective set of network usage characteristics, preferences, requirements, etc. to the application monitor 202 during operation. Further, each of the applications 210 can signal respective changes to the network usage characteristics, preferences, requirements, etc. to the application monitor 202 over time (e.g., as the applications 210 switch between different operational states). In some implementations, each of the applications can transmit signaling information in the form of one or more communication intent descriptors that specify how an application is communicating or is intending to communicate via a wireless network.

In some implementations, the application monitor 202 can infer at least a portion of the application data 212 based on the activities of the application 210. For instance, the application monitor 202 can obtain measurement data indicating the amount of data that is transmitted and/or received by each of the applications 210 via the wireless network, the rate at which the data is transferred, the times at which the data is transferred, the frequency at which the data is transferred, and so forth. Based on this information, the application monitor 202 can infer one or more network usage characteristics, preferences, requirements, etc. of the applications 210 over time.

As an example, the application monitor 202 can statistically infer a burst period and/or a burst size of an application 210 by determining the arrival times and data size of data received by the application over time. Further, in some implementations, application states may be characterized by periods of time during which burst period and/or burst size are stable (e.g., having a variation than is less than a particular threshold over the period of time). Accordingly, the application module 202 can infer that periods of time during which burst period and/or burst size are stable may correspond to a common state, whereas periods of time during which burst period and/or burst size differ may correspond to different states. Thus, the application monitor 202 can monitor changes in these parameters to infer of changes in application states and their associated session durations. Accordingly, the application module 202 can "learn" the characteristics of each of the applications 210 over time based on the network usage of each of the applications 210.

In some implementations, the application monitor 202 can infer at least a portion of the application data 212 based on user feedback. For example, an application 210 can initially have a particular default burst service latency limit. During use of the application 210, a user may manually specify that she would like the application to be more responsive (e.g., by selecting an appropriate option on a user interface of the application 210). Based on the user's feedback, the application monitor 202 can infer that the burst service latency limit of the application is to be shortened. Further, during use of the application 210, a user may manually specify that she would like the application to be more power efficient (e.g., by selecting an appropriate option on a user interface of the application 210). Based on the user's feedback, the application monitor 202 can infer that the burst service latency limit of the application is to be increased.

In some implementations, an application 210 can provide user feedback to the application monitor 202 via an application programming interface (API) associated with the application monitor 202. For example, an API can provide application developers with portions of computer code that can be incorporated into an application in order to implement a mechanism (e.g., a user interface) for receiving user feedback. Further, the API can facilitate the transmission of user feedback from the application 210 to the application monitor 202 (e.g., through the use of standardized functions or subroutines).

Figures 3A, 3B:
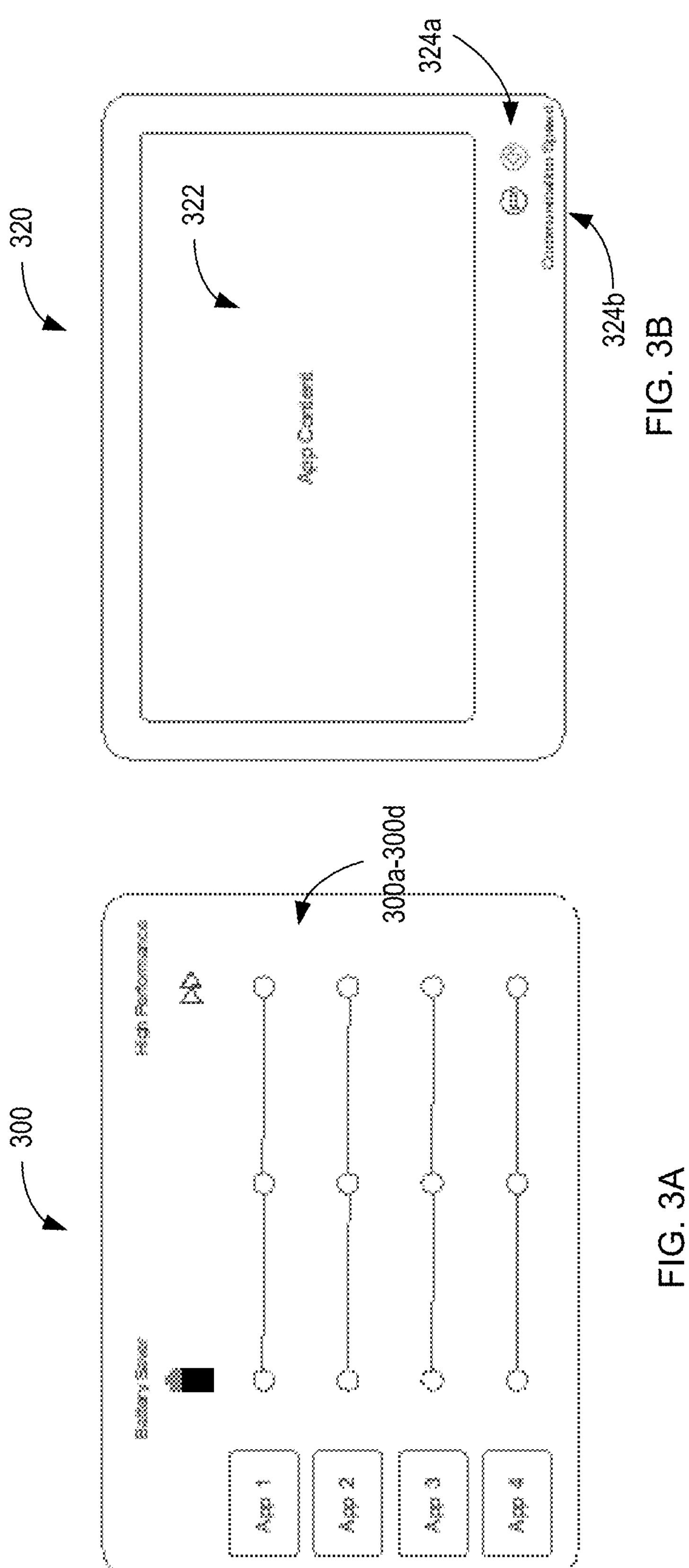
FIGS. 3A and 3B illustrate example user interfaces for receiving user feedback.

FIG. 3A shows an example user interface 300 for receiving user feedback. In this example, the user interface 300 indicates several applications that are installed on the user's electronic device (e.g., "App 1," "App 2," "App 3," etc.). Further, the user interface 300 includes user interface elements 302*a*-302*d* (e.g., "sliders") that enable a user to specify her preferences for the network performance of each application. For example, the user can indicate that she prefers that an application be allocated a larger amount of network resources (e.g., "high performance"). As another example, the user can indicate that she prefers that an application be more power efficient (e.g., "battery saver"). As another example, the user can indicate that she prefers that an application balances the network performance and power efficiency (e.g., "balanced" or "default"). The application monitor 202 can infer at least a portion of the application data 212 based on the user's selections. In some implementations, the user's selections using a user interface such as the user interface 300 may be referred to as "global user preferences."

FIG. 3B shows another example user interface 320 for receiving user feedback. In this example, the user interface 320 is associated with a video streaming application and includes a portion 322 for displaying video to a user. Further, the user interface 320 includes a user interface elements 324*a* and 324*b* (e.g., "buttons") that enable a user to specify her preferences for the network performance of the application. For example, as the user is viewing the video, the user can indicate that she prefers that an application be allocated a larger amount of network resources by selecting the user interface element 324*a* (e.g., to increase the quality of the video, such by increasing the resolution, bitrate, framerate, etc. of the video). As another example, the user can indicate that she prefers that an application conserve power by selecting the user interface element 324*b* (e.g., to decrease the quality of the video, such by decreasing the resolution, bitrate, framerate, etc. of the video). In some implementations, the user's selections using a user interface such as the user interface 320 may be referred to as "in app user reactions."

Referring to back to FIG. 2, the application monitor 202 generates individual network usage characteristics 214 for each of the applications 210, and provides the individual network usage characteristics 214 for each of the applications 210 to the aggregator 204 for further processing.

In some implementations, the individual network usage characteristics 214 can include at least some of the application data 212. For example, the individual network usage characteristics 214 can include, for each of the applications 210, a session duration, burst period, current burst period, burst size, burst service latency limit, and/or reliability metric for that application. As another example, the individual network usage characteristics 214 can include, for each of the applications 210, one or more communication intent descriptors for that application (e.g., specifying how that application is communicating or is intending to communicate via a wireless network). As another example, the individual network usage characteristics 214 can include, for each of the applications 210, feedback obtained by a user regarding the application.

In some implementations, at least a portion of the application data 212 and/or the individual network usage characteristics 214 can be provided to a remote system for aggregation with similar data obtained by one or more other electronic devices. This can be beneficial, for example, in "crowd sourcing" application data 212 and/or individual network usage characteristics 214 of applications, based on information provided by multiple electronic devices and their respective users. In some implementations, at least a portion of the application data 212 and/or the individual network usage characteristics 214 collected by the remote system can be provided to one or more electronic devices to facilitate the determination of applications' usage trends, preferences, and/or requirements.

Further, the aggregator 204 receives the individual network usage characteristics 214 regarding each of the applications 210 individually, and generates composite network usage characteristics 216 regarding the applications 210 collectively.

In general, the composite network usage characteristics 216 represents an aggregated summary of the applications' collective network usage trends. For instance, the composite network usage characteristics 216 can represent the applications' collective current usage of a wireless network, collective estimated or predicted future usage of the wireless network, collective preferences regarding usage of the wireless network, and/or collective requirements regarding usage of the wireless network by the applications 210.

In some implementations, at least a portion of the composite network usage characteristics 216 can be determined based on the application data 212 and/or the individual network usage characteristics 214.

As an example, the composite network usage characteristics 216 can indicate a composite burst period for the applications 210 collectively. In some implementations, the composite burst period can be selected by determining the individual burst periods of each of the applications 210, and selecting the shortest individual burst period.

As another example, the composite data rate network usage characteristics 216 can indicate a composite data rate for the applications 210 collectively. In some implementations, the composite data rate can be selected by sorting the applications 1 . . . i in increasing order of burst service latency limit $L_i$, and determining the composite data rate according to the relationship:

$$(\text{Composite Data Rate}) = \max_i\left((sum_{j\leq i}B_i)/L_i\right),$$

where $B_i$ is the burst size of an application i. Stated another way, the composite data rate for the applications 210 collectively can be determined by (1) determining, for each of the applications, a ratio of (i) a sum of the individual burst size of all of the applications that are less than or equal to the individual burst size of that application, and (ii) the individual burst service latency limit associated with the application; and (2) determining a largest of the ratios.

As another example, the composite network usage characteristics 216 can indicate a composite session duration for the applications 210 collectively. In some implementations, the composite session duration can be selected by determining the individual session durations of each of the applications 210, and selecting the shortest individual session duration. In some implementations, the composite session duration can be updated upon termination of any individual session and/or start of any new session based on the current set of sessions in operation.

The aggregator 204 provides at least a portion of the composite network usage characteristics 216 to the configuration manager 206. Based on the composite network usage characteristics 216, the configuration manager 206 selects a modem configuration 220 for operating a modem 208 of the electronic device from among a set of candidate modem configurations 218*a*-218*n*, and causes the modem 208 to transmit data to and/or receive data from a wireless network in accordance with the selected modem configuration 220.

In general, the configuration manager 206 selects a modem configuration 220 that satisfies the network usage preferences and/or requirements of the applications 210 (e.g., based on the composite network usage characteristics 216), while also maintaining a power efficiency of the electronic device. As an example, the configuration manager 206 can select a modem configuration 220 that allots sufficient resources to service each of the applications 210 in accordance with their network preferences and/or requirements, while reducing a likelihood of an overallotment of resource (which may negatively affect power efficiency of the device). As an example, the configuration manager 206 can select a modem configuration 220 that consumes the least amount of power, while still allotting sufficient resources to service each of the applications 210 in accordance with their network preferences and/or requirements.

Each of the candidate modem configurations 218*a*-218*n* includes a respective set of parameters for operating the modem 208. In general, the parameters can include any configurable parameter associated with transmitting data to and/or receiving data from a wireless network using the modem 208.

As an example, one or more of the candidate modem configurations 218*a*-218*n* can specify a respective Connected Mode Discontinuous Reception (C-DRX) parameter (e.g., a parameter specifying a period of time in which a UE device can be in a "sleep" state during which the UE device does not monitor transmissions from a wireless network).

As another example, one or more of the candidate modem configurations 218*a*-218*n* can specify a respective Connected Mode Discontinuous Transmission (C-DTX) parameter (e.g., a parameter specifying a period of time in which a UE device can be in a "sleep" state during which the UE device does not transmit data to a wireless network).

As another example, one or more of the candidate modem configurations 218*a*-218*n* can specify a respective Ratio Access Technology (RAT) parameter (e.g., a parameter specifying a particular RAT to transmit data to and/or receive data from a wireless network).

As another example, one or more of the candidate modem configurations 218*a*-218*n* can specify a respective an antenna configuration parameter (e.g., a parameter specifying a particular antenna configuration with which to transmit data to and/or receive data from a wireless network).

As another example, one or more of the candidate modem configurations 218*a*-218*n* can specify a respective a radio frequency (RF) chain configuration parameter (e.g., a parameter specifying a particular RF chain configuration, such as gain, noise figure/factor, overload level, etc., with which to transmit data to and/or receive data from a wireless network).

As another example, one or more of the candidate modem configurations 218*a*-218*n* can specify a respective component carrier configuration parameter (e.g., a parameter specifying a particular component carrier configuration with which to transmit data to and/or receive data from a wireless network).

As another example, one or more of the candidate modem configurations 218*a*-218*n* can specify a respective bandwidth configuration parameter (e.g., a parameter specifying a particular bandwidth configuration with which to transmit data to and/or receive data from a wireless network).

As another example, one or more of the candidate modem configurations 218*a*-218*n* can specify a respective receiver algorithmic mode parameter, (e.g., a parameter specifying a particular receiver algorithmic mode with which to transmit data to and/or receive data from a wireless network).

As another example, one or more of the candidate modem configurations 218*a*-218*n* can specify a respective transmitter algorithmic mode parameter (e.g., a parameter specifying a particular transmitted algorithm mode to transmit data to and/or receive data from a wireless network).

As another example, one or more of the candidate modem configurations 218*a*-218*n* can specify a respective energy profile parameter (e.g., a parameter specifying a particular energy mode with which to transmit data to and/or receive data from a wireless network).

As another example, one or more of the candidate modem configurations 218*a*-218*n* can specify a respective burst service latency parameter. (e.g., a parameter specifying a particular burst service latency with which to transmit data to and/or receive data from a wireless network).

As another example, one or more of the candidate modem configurations 218*a*-218*n* can specify the RF bands and/or band combinations with which to transmit data to and/or receive data from a wireless network.

As another example, one or more of the candidate modem configurations 218*a*-218*n* can specify the number of antennas, polarizations, receiver gain distribution, RF component configuration (e.g., low phase noise configuration, high SNR configuration), analog/mixed signal configuration (e.g., sampling rate and quantization levels), and/or baseband processing configuration (e.g., advanced receiver algorithms such as interference cancellation, iterative decoding) with which to transmit data to and/or receive data from a wireless network.

Although example modem configuration parameters are described herein, other modem configurations parameters are also possible, either instead of or in addition to those described herein.

In general, each of the candidate modem configurations 218*a*-218*n* enables the modem 208 to transmit data to and/or receive data from a wireless network according to a particular level of service (e.g., according to a particular throughput, latency, reliability, etc.). Further, each of the candidate modem configurations 218*a*-218*n* is associated with a particular level of power consumption by the electronic device (e.g., power to operate the modem 208, antennas, etc. in accordance with the modem configuration). As described above, in some implementations, the configuration manager 206 can select a modem configuration 220 from among the candidate modem configurations 218*a*-218*n* that causes the electronic device to consume the least amount of power, while still allotting sufficient resources to service each of the applications 210 in accordance with their network preferences and/or requirements.

In general, the configuration manager 206 can consider various factors or rules in selecting a modem configuration.

As an example, the configuration manager 206 can select a modem configuration having a C-DRX/DRX period that is shorter than the composite burst period of the applications 210.

As another example, the configuration manager 206 can select a modem configuration having a data rate that is greater than or equal to the composite data rate of the applications 210.

As another example, the configuration manager 206 can select a modem configuration having a burst service latency that is less than or equal to that of each of the applications 210.

As another example, the configuration manager 206 can select a modem configuration that provides a particular degree of reliability (e.g., to satisfy the reliability metrics of each of the applications 210).

In general, each modem configuration is associated with a respective energy profile, burst service latency, and burst size profile. Typically, modem configurations that achieve low latency may require more energy. Based on the composite network usage characteristics 216, the configuration manager 206 can select the most energy efficient modem configuration that meets the current or estimated future demand by the applications 210.

In some implementations, certain modem configurations (e.g., those with large bandwidth) may provide significant latency benefits at the expense of energy consumption. However, the benefit would be primarily applicable to those applications that have large burst sizes. In contrast, applications with smaller burst sizes may experience increased energy consumption without meaningful latency benefits. In such cases, knowledge of the composite burst size and the composite latency per modem configuration allows the configuration manager 206 to select the modem configuration with least energy consumption.

For instance, burst service latency may be a function of burst size as well as network and signal conditions. Further, signal conditions may determine the achievable data rate, while network behavior in the presence of loading determines the allocation of resources. Thus, a particular modem configuration can be selected to balance an application's preferences or requirements for a particular burst service latency and a particular burst size.

Figure 4B:
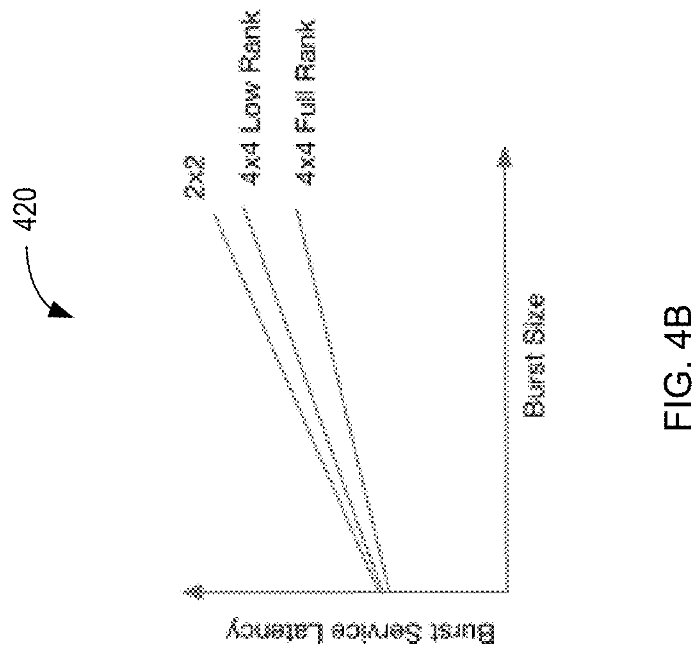
FIGS. 4A and 4B illustrate example relationship between burst size and burst service latency for various modem configurations.
Figure 4A:
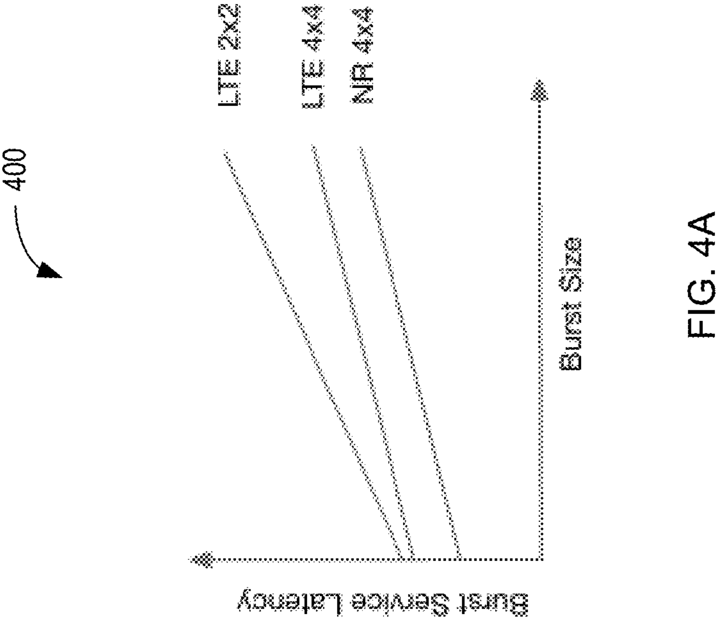

As an illustrative example, FIG. 4A shows a chart 400 depicting an example relationship between burst size and burst service latency for various modem configurations (e.g., LTE 2×2, LTE 4×4, and NR 4×4). The configuration manager 206 can select one of the example modems configurations to satisfy a composite burst size and a composite burst service latency limit for the applications 210 collectively, while minimizing the power that is consumed by the electronic device (e.g., by selecting the modem configuration having the lowest power consumption that still satisfies the composite network usage characteristics 216).

As another example, FIG. 4B shows a chart 420 depicting an example relationship between burst size and burst service latency for various additional modem configurations (e.g., 2×2, 4×4 Low Rank, and 4×4 Full Rank). The configuration manager 206 can select one of the example modems configurations to satisfy a composite burst size and a composite burst service latency limit for the applications 210 collectively, while minimizing the power that is consumed by the electronic device (e.g., by selecting the modem configuration having the lowest power consumption that still satisfies the composite network usage characteristics 216).

In some implementations, burst service latency versus burst size can be derived from data rate and DRX period as: (DRX period/2)+burst size/data rate. Further, additional terms may be included to capture the impact of application round trips across the network and other overheads.

In some implantations, burst service latency versus burst size can be a function of channel conditions and network loading. The system 200 can monitor both these factors and apply machine learning to update this curve on an ongoing basis.

Further, the wireless network can also assist the electronic device in determining the latency it can expect to achieve by sending additional information (e.g., the wireless network can send a Load Indicator to indicate the level of load it is experiencing). In some implementations, the Load Indicator can be in the form of a number representing the fraction of over the air resources the wireless network (or a specific cell in the wireless network) is using over a suitable averaging duration. In some implementations, the electronic device can also infer the level of network loading by measuring energy per resource element during a suitable averaging duration. Such loading estimates may be sent by the electronic device to a remote server, which can combine such estimates from several electronic device to form an improved estimate that is then relayed back to each of the electronic devices.

In some implementations, the level of service and/or the power consumption associated with each of the candidate modem configurations 218*a*-218*n* can be determined experimentally. For example, a developer can configure a modem according to different sets of parameters, and measure the level of service and/or the power consumption associated with each of the sets of parameters. In some implementations, a developer can collect measurement data from a group of users that operate their electronic devices according to different set of modem configurations and/or locations (e.g., to obtain "crowd sourced" information regarding the level of service and/or the power consumption associated with each of the modem configurations in different locations and/or usage conditions).

In some implementations, at least some of the candidate modem configurations 218*a*-218*n* can be expressly signaled to the system 200 by a wireless network. For example, a wireless network can transmit signaling information indicating candidate modem configurations that are compatible with the wireless network. In some implementations, at least some of the candidate modem configurations 218*a*-218*n* can be automatically generated by an electronic device (e.g., by automatically setting one or more modem configuration parameters to a particular value or option).

In some implementations, the system 200 can be configured to dynamically adjust the configuration of the modem 208 in response to different usage patterns and/or operating conditions. For example, the application monitor 202 can continuously or periodically determine application data 212 for each of the applications 210, generate individual network usage characteristics 214 for the applications, and provide the individual network usage characteristics 214 to the aggregator 204. Further, the aggregator 204 can continuously or periodically generate composite network usage characteristics 216 representing the applications 210 collectively, and provide the composite network usage characteristics 216 to the configuration manager 206. Further, the configuration manager 206 select from among the candidate modem configurations 218*a*-218*n*, and switch between different ones of the candidate modem configurations 218*a*-218*n* depending on changes in the composite network usage characteristics 216.

In some implementations, the configuration manager 206 can select a candidate modem configuration 218*a*-218*n* that satisfies the preferences or requirements of the applications 210 (while minimizing the power consumption of the electronic device). Further, upon determining that the selected modem configuration no longer satisfies the preferences or requirements of the applications 210 (e.g., due to changes in the usage patterns of the applications 210), the configuration manager 206 can select another candidate modem configuration 218*a*-218*n* that satisfies the preferences or requirements of the applications 210 (while minimizing the power consumption of the electronic device). Further still, upon determining that a different modem configuration can be used to reduce power consumption of the electronic device, while still satisfying the preferences or requirements of the applications 210, the configuration manager 206 can select that modem configuration to improve the efficiency of the electronic device.

In some implementations, switching between different modem configurations may incur a particular cost. As an example, switching between different modem configurations may interrupt the exchange of data between the electronic device and the wireless network for a period of time (e.g., to terminate communications using a previous modem configuration and/or to set up and establish communication using a new modem configuration). As another example, switching between different modem configurations may require that the electronic device expend a certain amount of power.

The configuration manager 206 can determine whether to switch the modem configuration based on these costs. For example, if the configuration manager 206 determines that switching to a different modem configuration would expend a large amount of power (e.g., greater than a threshold amount of power) without a sufficiently high gain in network performance (e.g., less than a threshold gain in network performance), the configuration manager 206 can maintain the currently selected modem configuration. As another example, if the configuration manager 206 determines that switching to a different modem configuration would result in a sufficiently high gain in network performance (e.g., greater than a threshold gain in network performance) and would not result in a large increase in power consumption (e.g., less than a threshold amount of power), the configuration manager 206 can switch to the new modem configuration.

In some implementations, the candidate modem configurations 218*a*-218*n* can include one or more default candidate modem configurations, and one or more specialized candidate modem configurations. In some implementations, the default candidate modem configurations can be modem configurations that are generally suitable for a wide range of applications and usage trends. Further, the specialized candidate modem configurations may be suitable for specific applications and/or usage trends. In some implementations, the configuration manager 206 can maintain the list of default candidate modem configurations, and dynamically change the specialized candidate modem configuration over time (e.g., based on changes to the types of applications and/or usage trends). In some implementations, the configuration manager 206 can rotate the specialized candidate modem configurations over time to identify new candidate modem configurations that may be particularly suitable for use with the modem 208.

Figure 5:
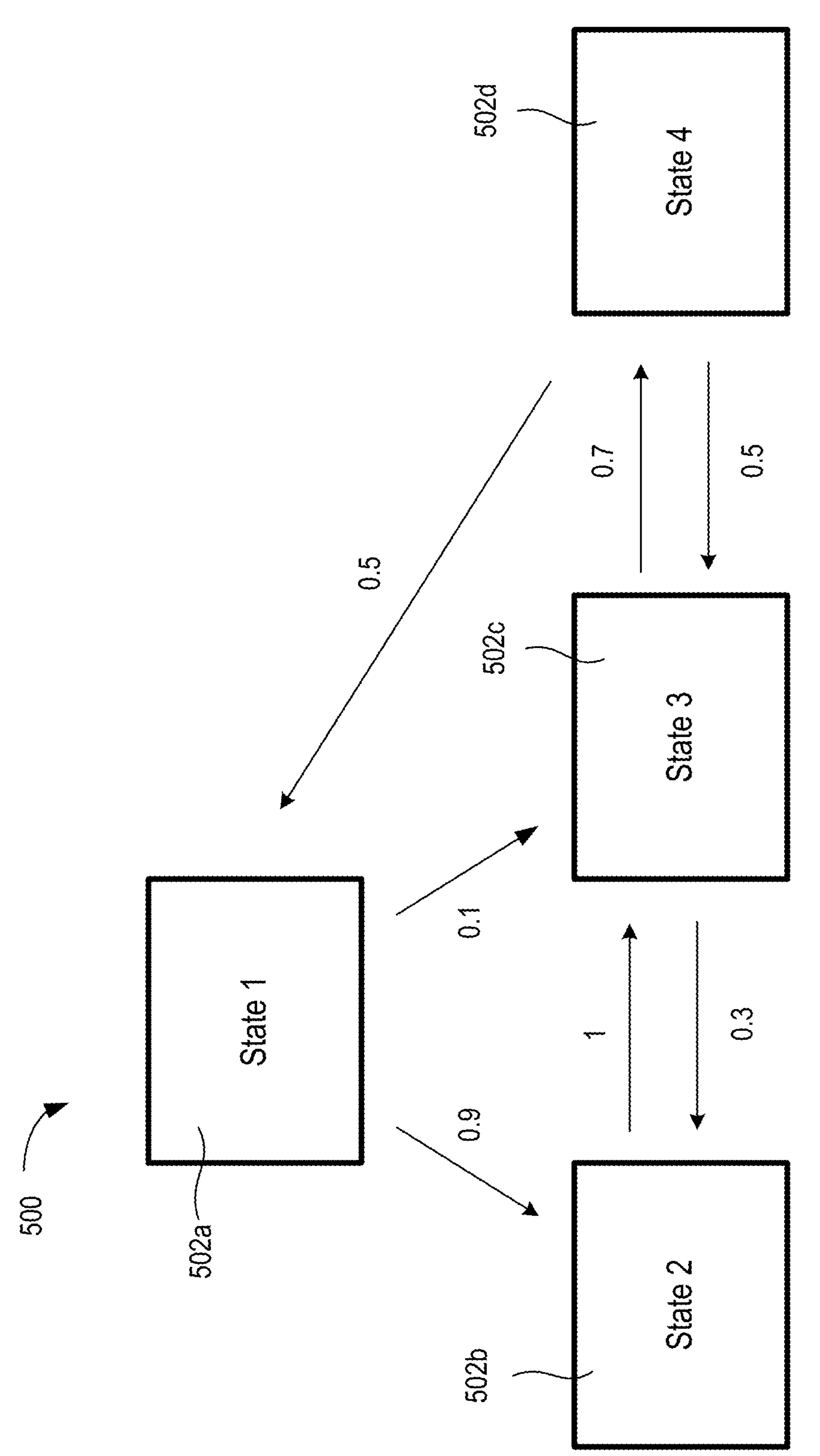
FIG. 5 illustrates an example state machine.

As described above, in some implementations, an application may operating according to multiple different states, each having a different set of network usage characteristics. In some implementations, these states can be represented by a state machine. An example state machine 500 is shown in FIG. 5. In this example, the state machine 500 includes four states 502*a*-502*d*. Further, an application can transition between the states 502*a*-502*d* according to the directional interconnections between them. For example, while the application is in a first state 502*a* ("State 1"), the application can transition to the second state 502*b* ("State 2") and the third state 502*c* ("State 3"), but not directly to the fourth state 502*d* ("State 4"). As another example, while the application is in the fourth state 502*d* ("State 4"), the application can transition to the third state 502*c* ("State 3") and/or the first state 502*a* ("State 1").

In some implementations, an application can expressly signal its current state and/or its expected future state to the application monitor 202 (e.g., by transmitting signaling information indicating those states). In some implementations, the each of the states can be assigned a corresponding identifier (e.g., an index value), and the application can expressly signal its current state and/or its expected future state by transmitting signaling information including the corresponding identifier(s) to the application monitor 202. In some implementations, the identifiers can be registered by an application with the application monitor 202 (e.g., upon installation and/or use of the application). In some implementations, the identifiers can be dynamically updated over time (e.g., to account for new states and/or to remove states that are no longer used).

In some implementations, the application monitor 202 can use a state machine to infer how an application may change its network usage characteristics over time. For example, based on a state machine, the application monitor 202 can determine that an application may transition to certain states, but cannot transition to other states. Further, the configuration manager 206 can select a modem configuration based on this information (e.g., by selecting a modem configuration that is more likely to accommodate the application's current and future states).

In some implementations, a state machine can also indicate a probability or likelihood that application will transition from one state to another. To illustrate, the state machine 500 shows probabilities for each of the transitions between states 502*a*-502*d* (e.g., indicated by probabilities by each of the directional interconnections). As an example, while the application is in a first state 502*a* ("State 1"), the application has a 90% probability of transitioning to the second state 502*b* ("State 2"), and a 10% probability of transitioning to the third state 502*c* ("State 3"). As another example, while the application is in the third state 502*c* ("State 3"), the application has a 30% probability of transitioning to the second state 502*b* ("State 2"), and a 70% probability of transitioning to the fourth state 502*d* ("State 4"). Based on a state machine, the application monitor 202 can determine that an application is more likely to transition to certain states, and is less likely to transition to other states. Further, the configuration manager 206 can select a modem configuration based on this information (e.g., by selecting a modem configuration that is more likely to accommodate the application's current and future states).

Figure 6:
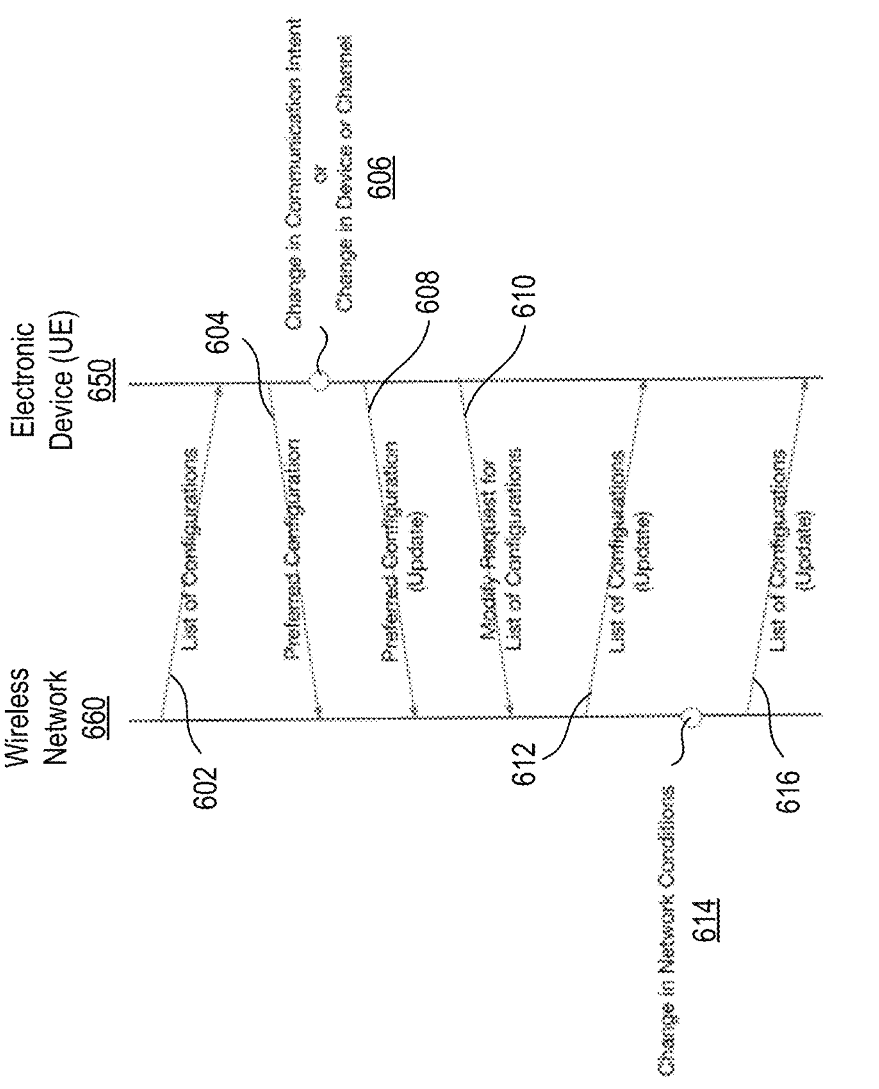
FIG. 6 illustrates an example process for exchange information between an electronic device and a wireless network regarding modem configurations and/or communication intent

In some implementations, an electronic device 650 (e.g., an UE device) can exchange information with a wireless network 660 (e.g., a BS of the wireless network) regarding modem configurations and/or communication intent. An example process 600 for exchange such information is shown in FIG. 6.

In the process 600, the wireless network 660 transmits information to the electronic device 650 indicating a list of modem configurations that the electronic device 650 can select from to communicate with the wireless network 660 (block 602).

Further, the electronic device 650 transmits information to the wireless network 660 indicating a preferred modem configuration of the electronic device 650 (block 604). In some implementations, the preferred modem configuration may be selected based on the system and techniques described herein (e.g., as described with reference to FIGS. 2-5).

In this example, the electronic device 650 changes its communication intent (block 606). As an example, the electronic device 650 can determine that, due to changes in the usage patterns of applications running on the electronic device 650, changing the configuration of the electronic device 650 may be beneficial (e.g., to satisfy the preferences and/or requirements of the applications and/or to improve power efficiency).

In response, the electronic device 650 transmits information to the wireless network 660 indicating a new preferred modem configuration of the electronic device 650 (block 608). In some implementations, the new preferred modem configuration may be selected based on the system and techniques described herein (e.g., as described with reference to FIGS. 2-5). In response, the wireless network 660 adjusts its operation, as needed, to accommodate the new preferred modem configuration of the electronic device 650.

Further, the electronic device 650 can also request that the wireless network 660 modify its list of modem configurations (block 610). In response, the wireless network 660 modifies its list of modem configurations (e.g., to include new modem configuration(s) specified by the electronic device 650), and transmits information to the electronic device 650 indicating the revised list of modem configurations to the electronic device 650 (block 612).

In this example, the wireless network 660 subsequently experiences a change in network conditions (block 614). For example, the wireless network 660 can be reconfigured to support additional modem configurations of the electronic device 650. As another example, the wireless network 660 can be reconfigured to no longer support certain modem configurations of the electronic device 650. In response, the wireless network 660 modifies its list of modem configurations (e.g., to include new modem configuration(s) and/or remove previous modem configuration(s)), and transmits information to the electronic device 650 indicating the revised list of modem configurations to the electronic device 650 (block 616).

In some implementations, the list of modem configurations can indicate an identifier for each of the modems configurations (e.g., an index number). Further, the wireless network 660 and the electronic device 650 can identify specific modem configuration to one another by signaling the identifier in a network transmission. As an example, the electronic device 650 can signal the identifier of a particular preferred modem configuration to the wireless network 660, rather than expressly signaling each of the parameters of that modem configuration individually. As another example, the wireless network 660 can update the list of modem configuration to include new modem configurations and corresponding identifiers, remove modem configurations and their corresponding identifiers, and/or reassign identifiers to different modem configurations.

Figure 7:
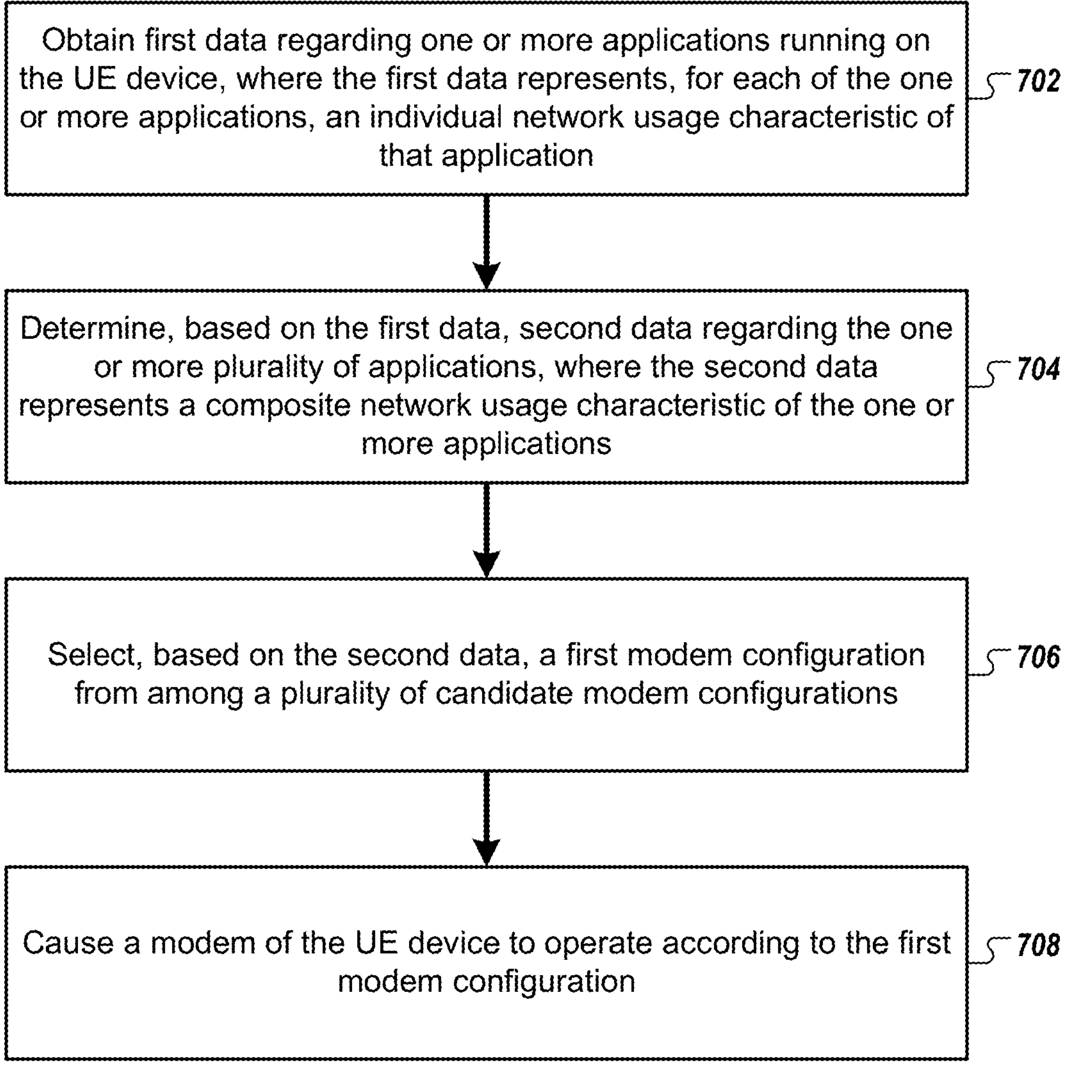
FIG. 7 illustrates a flowchart of an example method, according to some implementations.

FIG. 7 illustrates a flowchart of an example method 700, according to some implementations. For clarity of presentation, the description that follows generally describes method 700 in the context of the other figures in this description. For example, method 700 can be performed by the UE 102 (e.g., as shown in FIG. 1) and/or the system 200 (e.g., as shown in FIG. 2). It will be understood that method 700 can be performed, for example, by any suitable system, environment, software, hardware, or a combination of systems, environments, software, and hardware, as appropriate. In some implementations, various steps of method 700 can be run in parallel, in combination, in loops, or in any order.

In the method 700, a UE device obtains first data regarding one or more applications running on the UE device (block 702). The first data represents, for each of the one or more applications, an individual network usage characteristic of that application.

In some implementations, for each of the one or more applications, the individual network usage characteristic of that application can include at least one of: an individual communication session duration associated with that application, an individual burst period associated with that application, an individual burst size associated with that application, or an individual burst service latency limit associated with that application.

In some implementations, the first data can represent, for each of the one or more applications, a user preference regarding that application.

In some implementations, for each of the one or more applications, the user preference can include at least one of: a preference prioritizing an energy efficiency of the application, or a preference prioritizing a network performance of the application.

The UE device determines, based on the first data, second data regarding the one or more applications (block 704). The second data represents a composite network usage characteristic of the one or more applications.

In some implementations, the composite network usage characteristic can include a composite communication session duration associated with the one or more applications collectively.

In some implementations, the composite communication session duration can be determined by identifying a shortest of the individual communication session durations.

In some implementations, the composite network usage characteristic can include a composite burst period associated with the one or more applications collectively.

In some implementations, the composite burst period can be determined by identifying a shortest of the individual burst periods.

In some implementations, the composite network usage characteristics can include a composite data rate associated with the one or more applications collectively.

In some implementations, the composite data rate can be determined by: determining, for each of the applications, a ratio of (i) a sum of the individual burst size associated with the one or more applications that are less than or equal to the individual burst size of that application, and (ii) the individual burst service latency limit associated with the application; and determining a largest of the ratios.

The UE device selects, based on the second data, a first modem configuration from among a plurality of candidate modem configurations (block 706).

In some implementations, each of the candidate modem configurations can represent one or more parameters for transmitting and/or receiving data using the modem.

In some implementations, the one or more parameters can include at least one of: a Connected Mode Discontinuous Reception (C-DRX) parameter, a Connected Mode Discontinuous Transmission (C-DTX) parameter, a Ratio Access Technology (RAT) parameter, an antenna configuration parameter, a radio frequency (RF) chain configuration parameter, a component carrier configuration parameter, a bandwidth configuration parameter, a receiver algorithmic mode parameter, a transmitter algorithmic mode parameter, an energy profile parameter, or a burst service latency parameter.

In some implementations, at least some of the plurality of candidate modem configurations can be received by the UE device from a base station (BS) of a wireless network.

In some implementations, at least some of the plurality of candidate modem configurations can be transmitted from the UE device to a base station (BS) of a wireless network.

The UE device causes a modem of the UE device to operate according to the first modem configuration (block 708).

In some implementations, causing the modem to operate according to the first modem configuration can include causing the modem to switch from a second first modem configuration from among the plurality of candidate modem configurations to the first modem configuration.

In some implementations, causing the modem to switch from the second first modem configuration to the second first modem configuration can include determining a transition from the second modem configuration to the first modem configuration using a state machine.

In some implementations, selecting the first modem configuration can include determining that the first modem configuration satisfies the composite network usage characteristic.

The example method 700 shown in FIG. 7 can be modified or reconfigured to include additional, fewer, or different steps (not shown in FIG. 7), which can be performed in the order shown or in a different order.

Figure 8:
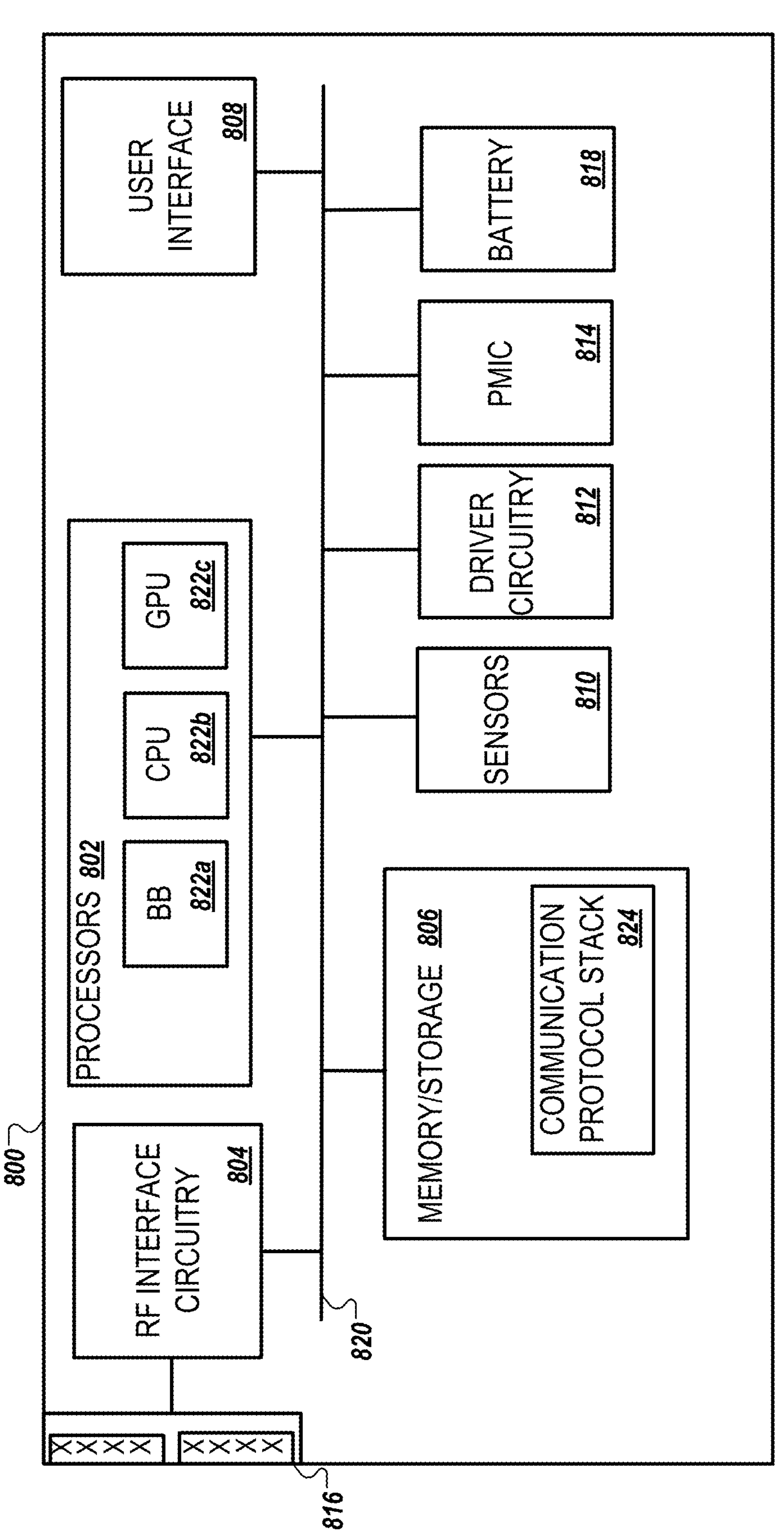
FIG. 8 illustrates a user equipment (UE), according to some implementations.

FIG. 8 illustrates a UE 800, according to some implementations. The UE 800 may be similar to and substantially interchangeable with UE 102 of FIG. 1.

The UE 800 may be any mobile or non-mobile computing device, such as, for example, mobile phones, computers, tablets, industrial wireless sensors (for example, microphones, pressure sensors, thermometers, motion sensors, accelerometers, inventory sensors, electric voltage/current meters, etc.), video devices (for example, cameras, video cameras, etc.), wearable devices (for example, a smart watch), relaxed-IoT devices.

The UE 800 may include processors 802, RF interface circuitry 804, memory/storage 806, user interface 808, sensors 810, driver circuitry 812, power management integrated circuit (PMIC) 814, antenna structure 816, and battery 818. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangement of the components shown may occur in other implementations.

The components of the UE 800 may be coupled with various other components over one or more interconnects 820, which may represent any type of interface, input/output, bus (local, system, or expansion), transmission line, trace, optical connection, etc. that allows various circuit components (on common or different chips or chipsets) to interact with one another.

The processors 802 may include processor circuitry such as, for example, baseband processor circuitry (BB) 822A, central processor unit circuitry (CPU) 822B, and graphics processor unit circuitry (GPU) 822C. The processors 802 may include any type of circuitry or processor circuitry that executes or otherwise operates computer-executable instructions, such as program code, software modules, or functional processes from memory/storage 806 to cause the UE 800 to perform operations as described herein.

In some implementations, the baseband processor circuitry 822A may access a communication protocol stack 824 in the memory/storage 806 to communicate over a 3GPP compatible network. In general, the baseband processor circuitry 822A may access the communication protocol stack to: perform user plane functions at a physical (PHY) layer, medium access control (MAC) layer, radio link control (RLC) layer, packet data convergence protocol (PDCP) layer, service data adaptation protocol (SDAP) layer, and PDU layer; and perform control plane functions at a PHY layer, MAC layer, RLC layer, PDCP layer, RRC layer, and a non-access stratum layer. In some implementations, the PHY layer operations may additionally/alternatively be performed by the components of the RF interface circuitry 804. The baseband processor circuitry 822A may generate or process baseband signals or waveforms that carry information in 3GPP-compatible networks. In some implementations, the waveforms for NR may be based cyclic prefix orthogonal frequency division multiplexing (OFDM) "CP-OFDM" in the uplink or downlink, and discrete Fourier transform spread OFDM "DFT-S-OFDM" in the uplink.

The memory/storage 806 may include one or more non-transitory, computer-readable media that includes instructions (for example, communication protocol stack 824) that may be executed by one or more of the processors 802 to cause the UE 800 to perform various operations described herein. The memory/storage 806 include any type of volatile or non-volatile memory that may be distributed throughout the UE 800. In some implementations, some of the memory/storage 806 may be located on the processors 802 themselves (for example, L1 and L2 cache), while other memory/storage 806 is external to the processors 802 but accessible thereto via a memory interface. The memory/storage 806 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 804 may include transceiver circuitry and radio frequency front module (RFEM) that allows the UE 800 to communicate with other devices over a radio access network. The RF interface circuitry 804 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 816 and proceed to filter and amplify (with a low-noise amplifier) the signal. The signal may be provided to a receiver of the transceiver that downconverts the RF signal into a baseband signal that is provided to the baseband processor of the processors 802.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 816. In various implementations, the RF interface circuitry 804 may be configured to transmit/receive signals in a manner compatible with NR access technologies.

The antenna 816 may include antenna elements to convert electrical signals into radio waves to travel through the air and to convert received radio waves into electrical signals. The antenna elements may be arranged into one or more antenna panels. The antenna 816 may have antenna panels that are omnidirectional, directional, or a combination thereof to enable beamforming and multiple input, multiple output communications. The antenna 816 may include microstrip antennas, printed antennas fabricated on the surface of one or more printed circuit boards, patch antennas, phased array antennas, etc. The antenna 816 may have one or more panels designed for specific frequency bands including bands in FR1 or FR2.

The user interface 808 includes various input/output (I/O) devices designed to enable user interaction with the UE 800. The user interface 808 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 800.

The sensors 810 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; temperature sensors (for example, thermistors); pressure sensors; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 812 may include software and hardware elements that operate to control particular devices that are embedded in the UE 800, attached to the UE 800, or otherwise communicatively coupled with the UE 800. The driver circuitry 812 may include individual drivers allowing other components to interact with or control various input/output (I/O) devices that may be present within, or connected to, the UE 800. For example, driver circuitry 812 may include a display driver to control and allow access to a display device, a touchscreen driver to control and allow access to a touchscreen interface, sensor drivers to obtain sensor readings of sensor circuitry 828 and control and allow access to sensor circuitry 828, drivers to obtain actuator positions of electro-mechanic components or control and allow access to the electro-mechanic components, a camera driver to control and allow access to an embedded image capture device, audio drivers to control and allow access to one or more audio devices.

The PMIC 814 may manage power provided to various components of the UE 800. In particular, with respect to the processors 802, the PMIC 814 may control power-source selection, voltage scaling, battery charging, or DC-to-DC conversion.

In some implementations, the PMIC 814 may control, or otherwise be part of, various power saving mechanisms of the UE 800. A battery 818 may power the UE 800, although in some examples the UE 800 may be mounted deployed in a fixed location, and may have a power supply coupled to an electrical grid. The battery 818 may be a lithium ion battery, a metal-air battery, such as a zinc-air battery, an aluminum-air battery, a lithium-air battery, and the like. In some implementations, such as in vehicle-based applications, the battery 818 may be a typical lead-acid automotive battery.

Figure 9:
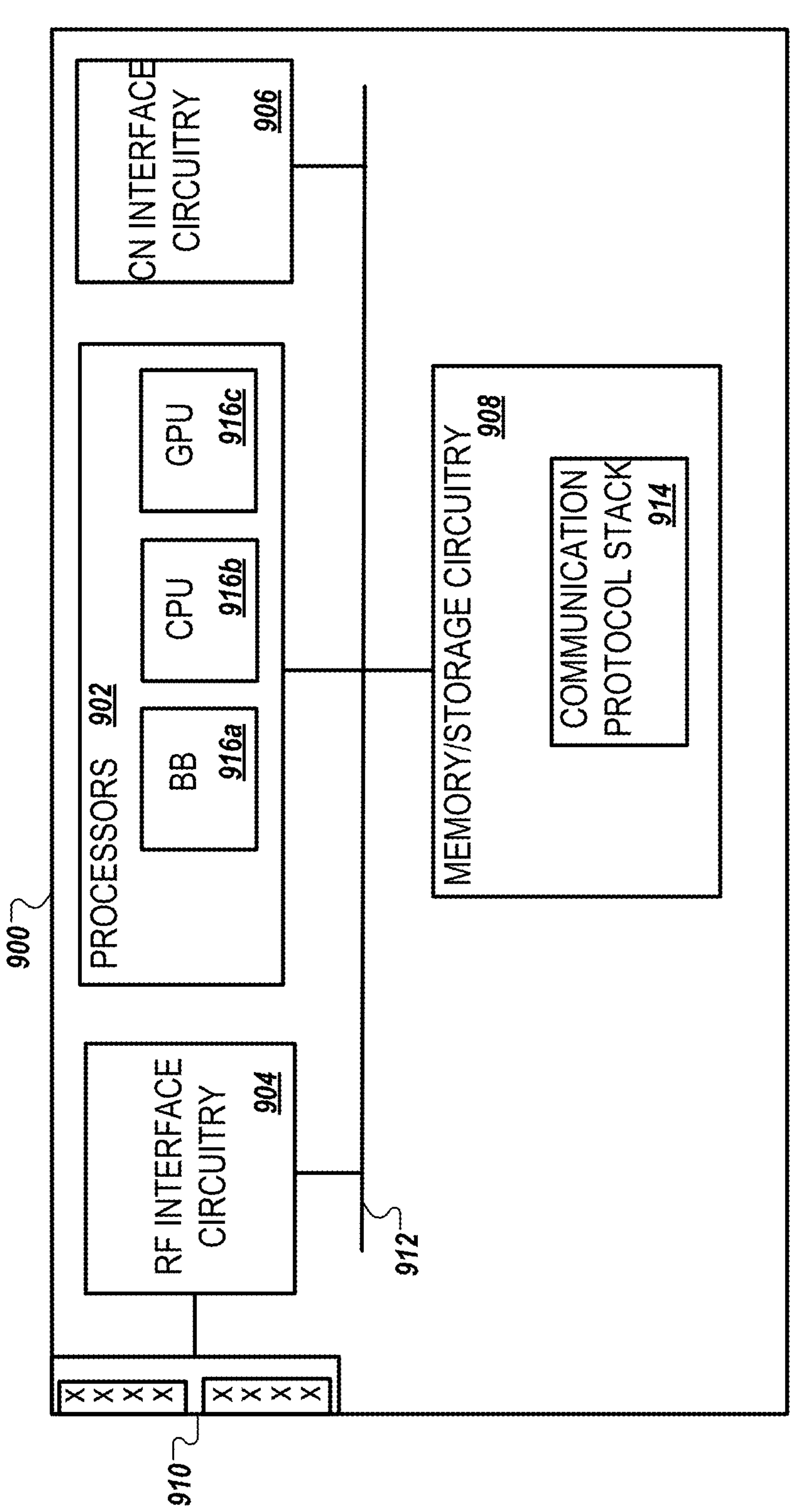
FIG. 9 illustrates an access node, according to some implementations.

FIG. 9 illustrates an access node 900 (e.g., a base station or gNB), according to some implementations. The access node 900 may be similar to and substantially interchangeable with base station 104. The access node 900 may include processors 902, RF interface circuitry 904, core network (CN) interface circuitry 906, memory/storage circuitry 908, and antenna structure 910.

The components of the access node 900 may be coupled with various other components over one or more interconnects 912. The processors 902, RF interface circuitry 904, memory/storage circuitry 908 (including communication protocol stack 914), antenna structure 910, and interconnects 912 may be similar to like-named elements shown and described with respect to FIG. 8. For example, the processors 902 may include processor circuitry such as, for example, baseband processor circuitry (BB) 916A, central processor unit circuitry (CPU) 916B, and graphics processor unit circuitry (GPU) 916C.

The CN interface circuitry 906 may provide connectivity to a core network, for example, a 5th Generation Core network (5GC) using a 5GC-compatible network interface protocol such as carrier Ethernet protocols, or some other suitable protocol. Network connectivity may be provided to/from the access node 900 via a fiber optic or wireless backhaul. The CN interface circuitry 906 may include one or more dedicated processors or FPGAs to communicate using one or more of the aforementioned protocols. In some implementations, the CN interface circuitry 906 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 900 that operates in an NR or 5G system (for example, a gNB), and the term "E-UTRAN node" or the like may refer to an access node 900 that operates in an LTE or 4G system (e.g., an eNB). According to various implementations, the access node 900 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the access node 900 may be implemented as one or more software entities running on server computers as part of a virtual network, which may be referred to as a CRAN and/or a virtual baseband unit pool (vBBUP). In V2X scenarios, the access node 900 may be or act as a "Road Side Unit." The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A UE device comprising one or processors and one or more storage devices on which are stored instructions that are operable, when executed by the one or more processors, to cause the one or more processors to perform operations comprising:

obtaining first data regarding one or more applications running on the UE device, wherein the first data represents, for each of the one or more applications, an individual network usage characteristic of that application;

determining, based on the first data, second data regarding the one or more applications, wherein the second data represents a composite network usage characteristic of the one or more applications;

selecting, based on the second data, a first modem configuration from among a plurality of candidate modem configurations based on a determination that the first modem configuration satisfies the composite network usage characteristic; and causing a modem of the UE device to operate according to the first modem configuration.

2. The UE device of claim 1, wherein for each of the one or more applications, the individual network usage characteristic of that application comprises at least one of:

an individual communication session duration associated with that application, an individual burst period associated with that application, an individual burst size associated with that application, or an individual burst service latency limit associated with that application.

3. The UE device of claim 2, wherein the composite network usage characteristic comprises a composite communication session duration associated with the one or more applications collectively.

4. The UE device of claim 3, wherein the composite communication session duration is determined by identifying a shortest of the individual communication session durations.

5. The UE device of claim 2, wherein the composite network usage characteristic comprises a composite burst period associated with the one or more applications collectively.

6. The UE device of claim 5, wherein the composite burst period is determined by identifying a shortest of the individual burst periods.

7. The UE device of claim 2, wherein the composite network usage characteristics comprises a composite data rate associated with the one or more applications collectively.

8. The UE device of claim 7, wherein the composite data rate is determined by:

determining, for each of the applications, a ratio of (i) a sum of the individual burst size associated with the one or more applications that are less than or equal to the individual burst size of that application, and (ii) the individual burst service latency limit associated with the application; and determining a largest of the ratios.

9. The UE device of claim 1, wherein each of the candidate modem configurations represents one or more parameters for transmitting and/or receiving data using the modem.

10. The UE device of claim 9, wherein the one or more parameters comprises at least one of:

a Connected Mode Discontinuous Reception (C-DRX) parameter, a Connected Mode Discontinuous Transmission (C-DTX) parameter, a Ratio Access Technology (RAT) parameter, an antenna configuration parameter, a radio frequency (RF) chain configuration parameter, a component carrier configuration parameter a bandwidth configuration parameter, a receiver algorithmic mode parameter, a transmitter algorithmic mode parameter, an energy profile parameter, or a burst service latency parameter.

11. The UE device of claim 1, wherein the first data represents, for each of the one or more applications, a user preference regarding that application.

12. The UE device of claim 11, for each of the one or more applications, the user preference comprises at least one of:

a preference prioritizing an energy efficiency of the application, or a preference prioritizing a network performance of the application.

13. The UE device of claim 11, wherein the user preference is received using a user interface presented by the UE device.

14. The UE device of claim 1, wherein causing the modem to operate according to the first modem configuration comprises:

causing the modem to switch from a second modem configuration from among the plurality of candidate modem configurations to the first modem configuration.

15. The UE device of claim 14, wherein causing the modem to switch from the second modem configuration to the first modem configuration comprises:

determining a transition from the second modem configuration to the first modem configuration using a state machine.

16. The UE device of claim 1, wherein at least some of the plurality of candidate modem configurations is received by the UE device from a base station (BS) of a wireless network.

17. The UE device of claim 1, wherein at least some of the plurality of candidate modem configurations are transmitted from the UE device to a base station (BS) of a wireless network.

18. An apparatus comprising one or more baseband processors configured to perform operations comprising:

obtaining first data regarding one or more applications running on an UE device, wherein the first data represents, for each of the one or more applications, an individual network usage characteristic of that application;

determining, based on the first data, second data regarding the one or more applications, wherein the second data represents a composite network usage characteristic of the one or more applications;

selecting, based on the second data, a first modem configuration from among a plurality of candidate modem configurations based on a determination that the first modem configuration satisfies the composite network usage characteristic; and causing a modem of the UE device to operate according to the first modem configuration.

19. A method comprising:

obtaining first data regarding one or more applications running on an UE device, wherein the first data represents, for each of the one or more applications, an individual network usage characteristic of that application;

determining, based on the first data, second data regarding the one or more applications, wherein the second data represents a composite network usage characteristic of the one or more applications;

selecting, based on the second data, a first modem configuration from among a plurality of candidate modem configurations based on a determination that the first modem configuration satisfies the composite network usage characteristic; and causing a modem of the UE device to operate according to the first modem configuration.

* * * * *